June 5, 1934.  A. T. FICK  1,961,142
SWITCH FOR AUTOMOBILE INDICATORS
Filed March 20, 1933
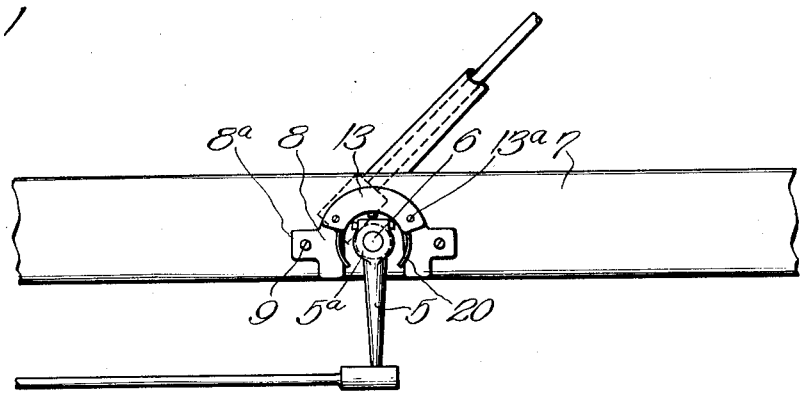
Fig. 1
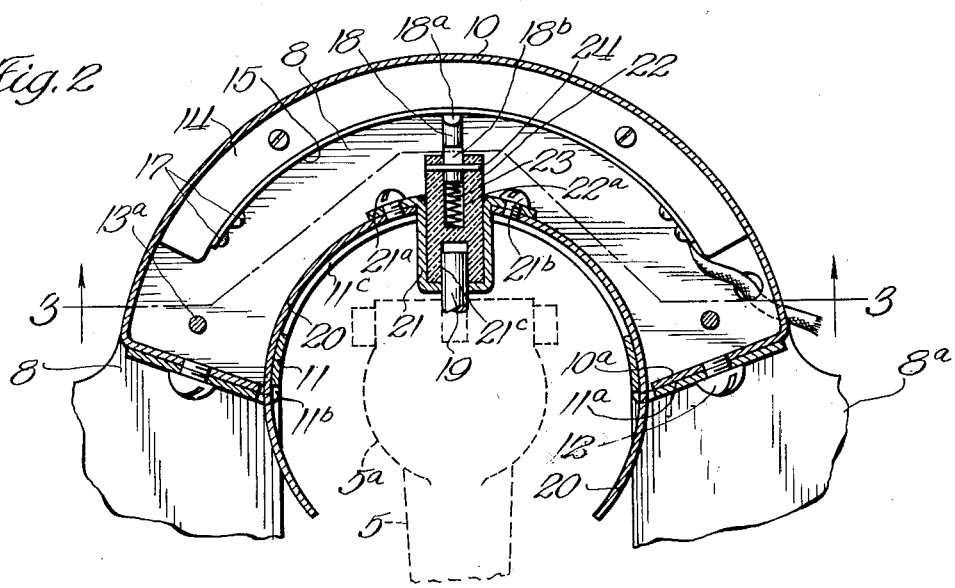
Fig. 2
Fig. 3
INVENTOR:-
Albert T. Fick
BY Milo B. Stevens & Co.
ATTORNEYS.

Patented June 5, 1934

1,961,142

UNITED STATES PATENT OFFICE 1,961,142

SWITCH FOR AUTOMOBILE INDICATORS

Albert T. Fick, Chicago, Ill.

Application March 20, 1933, Serial No. 661,804

1 Claim. (Cl. 200—59)

My invention relates to switches for that type of automobile indicators which automatically point out the direction in which the automobile is about to turn, and more particularly to such switches as are actuated by the steering arm of the car, and my main object is to provide a novel apparatus which is dependable in operation.

A further object of the invention is to design the working mechanism of the novel switch on lines of definite support and guidance, and in order that it may withstand the shocks and vibrations incident to the travel of the car.

A still further object of the invention is to embody the novel switch in a housing which is adaptable to the frame member behind the steering arm and is easily accessible for inspection or repair.

Another object of the invention is to construct the mechanism of the novel switch on lines of simplicity and with few parts which are ample in size and free of complications.

With the above objects in view and any others that may suggest themselves from the specification and claim to follow, a better understanding of the invention may be had by reference to the accompanying drawing, in which—

Fig. 1 is an elevation of the novel switch, showing the manner in which it is installed;

Fig. 2 is a frontal section thereof; and

Fig. 3 is a section on the line 3—3 of Fig. 2.

I am aware of the fact that directional signals or indicators for automobiles have been devised for control by the agency of the steering arm, since the latter is easily accessible, has a course of travel readily adaptable for the purposes of the switch, is in a position to be relatively free of oil and dust, and suffers little jar or vibration. My improvement is mainly in the type of switch which is best suited to take the control from the steering arm, the novel embodiment carrying out the foregoing objects to their fullest extent.

Referring specifically to the drawing, 5 denotes the steering arm, 6 the shaft on which it is mounted, and 7 the automobile frame member carrying such shaft. For the purpose of my invention, I apply an arch-shaped plate 8 to the face of the member 7, forming the plate with wings 8a through which bolts 9 are directed into the frame member to firmly secure the plate 8 to the same.

The plate 8 forms the back of a segment shaped housing 10 for the novel switch. This housing is of metal, and its outer wall terminates with inward bends 10a. It is provided with an inner wall 11 of substantially semi-circular form which is extended with outward bends 11a. These bends apply to the bends 10a from the under side and are secured thereto by screws 12. The substantially semi-circular housing formed by the walls and bends just described receives a frontal closure plate 13 of corresponding form, screws 13a passing from the same into the back wall 8 of the housing whereby to firmly secure the wall 13 to the same. The latter has a reduction 13b on the inner side which snugly fits into the rim of the housing whereby to close the same against the entrance of dust or water.

The outer wall 10 of the housing receives an arcuate block 14 of insulation on the inside, this block carrying a metallic facing strip 15 along one edge, and the sections 16 and 16a of a similar strip in spaced parallelism to the strip 15. The metallic strips are secured by screws 17 or other suitable means to the block, and the sections 16 and 16a of the second strip are separated by a projection 14a of the insulation block 14, the projection being, however, flush with the surface of the strip sections. A brush 18 having a cross head 18a is adapted to be moved along the course of the metallic strips with the cross head 18a spanning the same as indicated in Fig. 3. This figure shows the cross head in contact with the strip 15 and the insulation projection 14, but it will be understood that when the brush is moved toward the left, the strips 15 and 16 will be connected, and when it is moved toward the right the strips 15 and 16a will be connected.

The strips 15, 16 and 16a are intended for contact purposes in the circuit of a typical left-and-right automobile indicator, which is diagrammatically illustrated in Fig. 3. It follows without further description that the brush 18 is shown in Fig. 3 to be in neutral position, and that its movement in one or the other direction will illuminate or otherwise actuate the corresponding side of the indicator.

In order that the steering arm may function as a control for the switch, I fit the head 5a of the said arm with a pin 19 extending in the opposite direction from the arm. This pin may be screwed into a tapped bore made in the arm head; or, the latter may be cast or formed with the pin as standard equipment.

Along the inside of the housing wall 11, I provide the sections of a part-circular metallic strip 20, causing these sections to be joined by the interposition of a cup 21 formed with outward bends 21a which overlie the inner ends of the sections 20 and are secured thereto by screws 21b. The cup 21 thus forms a connection and reinforcement for the sections of the strip 20 and is perforated in its bottom as indicated at 21c to receive the steering arm pin 19 as clearly shown in Fig. 2. Thus, as the steering arm swings in one or the other direction, it will move the cup 21 accordingly and slide the strip 20 around the housing wall 11. The latter is perforated at its ends as indicated at 11b to permit the egress of the strip 20 from the housing, the strip being of sufficient length to maintain one end well out of the housing when the other end has advanced to the end of its course, so that the strip will not be impeded by the housing in either direction; and the wall 11 is, of course, longitudinally perforated at 11c to clear the cup 21 as the strip 20 moved in the manner described. The cup 21 receives a post 22 of insulation, this post being bored from its outer end as indicated at 22a. In the bore is lodged an expansive spring 23 upon which rests the shank of the brush 18, as clearly shown in Fig. 2. The spring maintains the shank in contact with the strips 15 and 16 or 16a; and the shank is cut in from the side as indicated at 18b to provide clearance for a cross pin 24 driven through the post 22. The recess in the side of the brush provides by means of its ends stops to prevent the discharge or excessive sinking of the brush relative to the post 22.

It will be seen that the novel switch presents a simple and compact structure for the purpose specified. The housing is firmly secured to the frame member 7 by means of the backing plate 8; and the frontal plate 13 may be quickly removed in case it is necessary to inspect, adjust or repair the switch, being in a position of easy access. The arcuate strip 20 in its closely sliding relation with the inner wall 11 of the housing receives a firm support and positive guidance for its circular movement, the passage of the end portions of the strip through the ends of the housing also providing retaining means in the openings 11b to hold the strip 20 truly to its course. Thus, the proper travel of the brush is assured, and the strip 20 also forms a closure shield for the slot 11c in the wall 11 against the entrance of dust and water into the housing. The cup 21 and its posts 22 form a sturdy receptacle for the steering arm pin 19 and an ample reinforcement to assure the transfer of motion to the sections of the strip 20. The contact strips 15, 16 and 16a being along the ceiling of the housing, so to speak, are in a position to shed dust and water at all times and keep dry and clean, assuring good electrical contact. Further, the assembly of the housing sections by means of the superimposed bends 10a and 11a makes it easy to take the inner or lower unit of the housing off by merely removing the screws 12 in case a major inspection or repair is necessary. Moreover, this method of assembly enables the housing outer and inner walls to be made from strip material. Finally, it will be evident that the novel switch is a structure which is composed of few parts, which are simple, sturdy and devoid of complicated or delicate elements or mechanisms which may require frequent repair or attention.

I claim:—

In a switch, an arcuate housing having side and end walls, one of said walls being provided with a longitudinal slot, and said end walls having each a transverse guide slot adjacent said longitudinally slotted wall, an arcuate shield slidably mounted on said longitudinally slotted wall to close its slot, end extensions on said shield and projecting through said guide slots in all positions of the shield whereby to retain said shield in assembled position, cooperating contact means on said shield and housing wall structure, and a switch actuator member attached to said shield and extending through the slot of said longitudinally slotted wall.

ALBERT T. FICK.